C. N. WHITE.
Churn.

No. 81,445.

Patented Aug. 25, 1868.

Witnesses:
W. C. Ashkettle
Wm. A. Morgan

Inventor:
C. N. White
per Munn
Attorneys

United States Patent Office.

C. N. WHITE, OF BATESVILLE, MISSISSIPPI, ASSIGNOR TO HIMSELF, W. S. HARRIS, AND T. P. ROLAND, OF SAME PLACE.

Letters Patent No. 81,445, dated August 25, 1868.

IMPROVEMENT IN CHURNS.

The Schedule referred to in these Letters Patent and making part of the same.

TO ALL WHOM IT MAY CONCERN:

Be it known that I, C. N. WHITE, of Batesville, in the county of Palona, and State of Mississippi, have invented a new and useful Improvement in Churns; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

My invention has for its object to furnish an improved churn, simple in construction, easily operated, in which waste in churning and the ingress of dust or other impurities are effectually guarded against, and which will bring the butter in a very short time.

And it consists in the construction and combination of the various parts, as hereinafter more fully described.

A is the platform or ground-frame of the machine.

Figure 1:
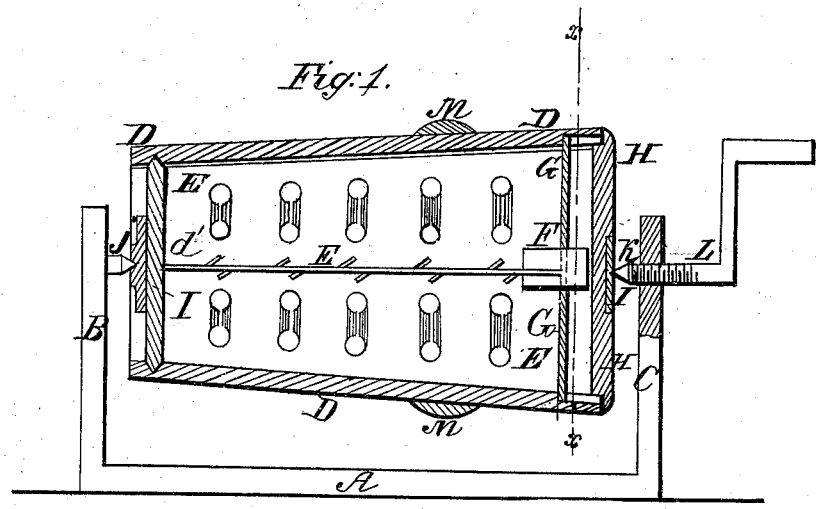
Figure 1 is a vertical longitudinal central section of my improved churn.
Figure 2:
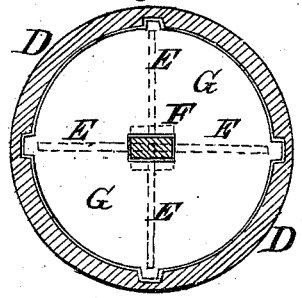
Figure 2 is a vertical cross-section of the same, taken through the line $x\ x$, fig. 1.

B and C are standards attached to the frame A, at such a distance apart as to receive the churn-body, D, between them, as shown in fig. 1.

The body, D, of the churn, may be made cylindrical in form, or tapering, as may be desired.

E is the dasher, which consists of four plates, set at right angles to each other, and made of such a size and shape as to fit into the interior of the churn-body, D.

The outer ends of the plates E, at the point where the four plates meet, are securely attached to a block, F, which has a rectangular tenon formed upon its outer end, fitting into a rectangular hole in the centre of the plate G.

The plate G fits into the mouth of the churn, and has several ears or projections formed upon its edge, which enter recesses formed in the body, D, of the churn, for their reception, so that the plate G, and consequently the plates E, may be kept from revolving or changing their proper positions in the said body of the churn.

H is the cover of the churn, which fits closely into the mouth of the churn-body, and which, when in place, should be in contact with the outer end of the block F.

To the centre of the cover H, and of the bottom $d'$ of the churn-body D, are attached sockets or plates I, to receive the centres upon which the churn is pivoted.

The centre, J, at the bottom of the churn, is stationary, being securely attached to the standard B.

The centre, K, at the mouth of the churn, is formed upon the forward end or point of the crank-screw L, so that it may be readily turned out to release the churn, and turned in to again pivot the said churn.

Each of the plates E is perforated with two parallel rows of holes, each pair of holes being connected by a slit, the edges of which are turned or bent in opposite directions, as shown in fig. 1.

The lips thus formed may be inclined in different directions in the adjacent plates, so as to more thoroughly break up the currents as they are formed by the milk being forced through the slotted plates E by the revolution of the churn.

As the revolution of the churn should not be rapid, it may be revolved by means of the ears M, attached to the outer side of the churn-body D, or motion may be given to it in any other convenient manner.

I claim as new, and desire to secure by Letters Patent—

1. The combination of the dasher-plates E, block F, plate G, and cover H, with each other, and with the churn-body, D, said parts being constructed and arranged substantially as herein shown and described and for the purpose set forth.

2. In combination with the above, and with the frame A B C, the fixed centre $j$ and crank-screw L, all arranged and operating substantially as and for the purpose set forth.

C. N. WHITE.

Witnesses:
    B. L. BALLARD,
    J. M. BOYLES.